US012638864B2

(12) United States Patent
Hashizume et al.

(10) Patent No.: US 12,638,864 B2
(45) Date of Patent: May 26, 2026

(54) WORK VEHICLE, CONTROL DEVICE, CONTROL METHOD, AND SYSTEM

(71) Applicant: HONDA MOTOR CO., LTD., Tokyo (JP)

(72) Inventors: Takashi Hashizume, Wako (JP); Ryuichi Kimata, Tokyo (JP); Ryota Hisada, Tokyo (JP); Koichi Tsuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 18/760,434

(22) Filed: Jul. 1, 2024

(65) Prior Publication Data

US 2024/0353865 A1    Oct. 24, 2024

Related U.S. Application Data

(63) Continuation of application No. PCT/JP2022/000428, filed on Jan. 7, 2022.

(51) Int. Cl.
G05D 1/698 (2024.01)
G05D 1/246 (2024.01)
(Continued)

(52) U.S. Cl.
CPC ........... G05D 1/6987 (2024.01); G05D 1/246 (2024.01); *G05D 2105/05* (2024.01); *G05D 2107/90* (2024.01)

(58) Field of Classification Search
CPC .. G05D 1/6987; G05D 1/246; G05D 2107/90; G05D 2105/05
(Continued)

(56) References Cited

U.S. PATENT DOCUMENTS 9,483,056 B2    11/2016   Kanai et al.
2015/0206433 A1*    7/2015   Kanai ..................... G08G 1/165
701/1

(Continued)

FOREIGN PATENT DOCUMENTS

JP        2000-339026 A        12/2000
JP        2005-202978 A        7/2005
(Continued)

OTHER PUBLICATIONS

International Search Report for PCT/JP2022/000428 mailed Mar. 29, 2022 with partial English Translation.
IPRP for PCT/JP2022/000428 mailed Oct. 10, 2023.

*Primary Examiner* — Yazan A Soofi
(74) *Attorney, Agent, or Firm* — THOMAS | HORSTEMEYER, LLP

(57) ABSTRACT

A work vehicle including a control unit configured to control traveling of the work vehicle such that the work vehicle and an oncoming vehicle are able to pass each other in a vehicle passage, wherein the control unit controls the traveling of the work vehicle such that the work vehicle travels in a first region when the work vehicle and the oncoming vehicle pass each other, and controls the traveling of the work vehicle such that the work vehicle is retreated to a third region to which the work vehicle is capable of being retreated from a second region in a case where the work vehicle is incapable of traveling in the first region when the work vehicle and the oncoming vehicle pass each other.

12 Claims, 8 Drawing Sheets

(51) Int. Cl.
  G05D 105/05       (2024.01)
  G05D 107/90       (2024.01)

(58) Field of Classification Search
  USPC .......................................................... 701/28
  See application file for complete search history.

(56)                    References Cited

U.S. PATENT DOCUMENTS

| | | | |
|---|---|---|---|
| 2020/0103882 A1* | 4/2020 | Sullivan ........... | G05B 19/41895 |
| 2024/0275680 A1* | 8/2024 | Palnati .................... | H04L 43/12 |
| 2025/0051152 A1* | 2/2025 | Zhang ...................... | B66F 9/063 |
| 2025/0100859 A1* | 3/2025 | Yamaguchi ............... | B66F 9/24 |
| 2025/0220383 A1* | 7/2025 | Satloff .................. | G10L 19/008 |

FOREIGN PATENT DOCUMENTS

| | | |
|---|---|---|
| JP | 2015-138311 A | 7/2015 |
| JP | 5984986 B1 | 9/2016 |
| JP | 6066241 B1 | 1/2017 |
| WO | 2023/132080 A1 | 7/2023 |

* cited by examiner

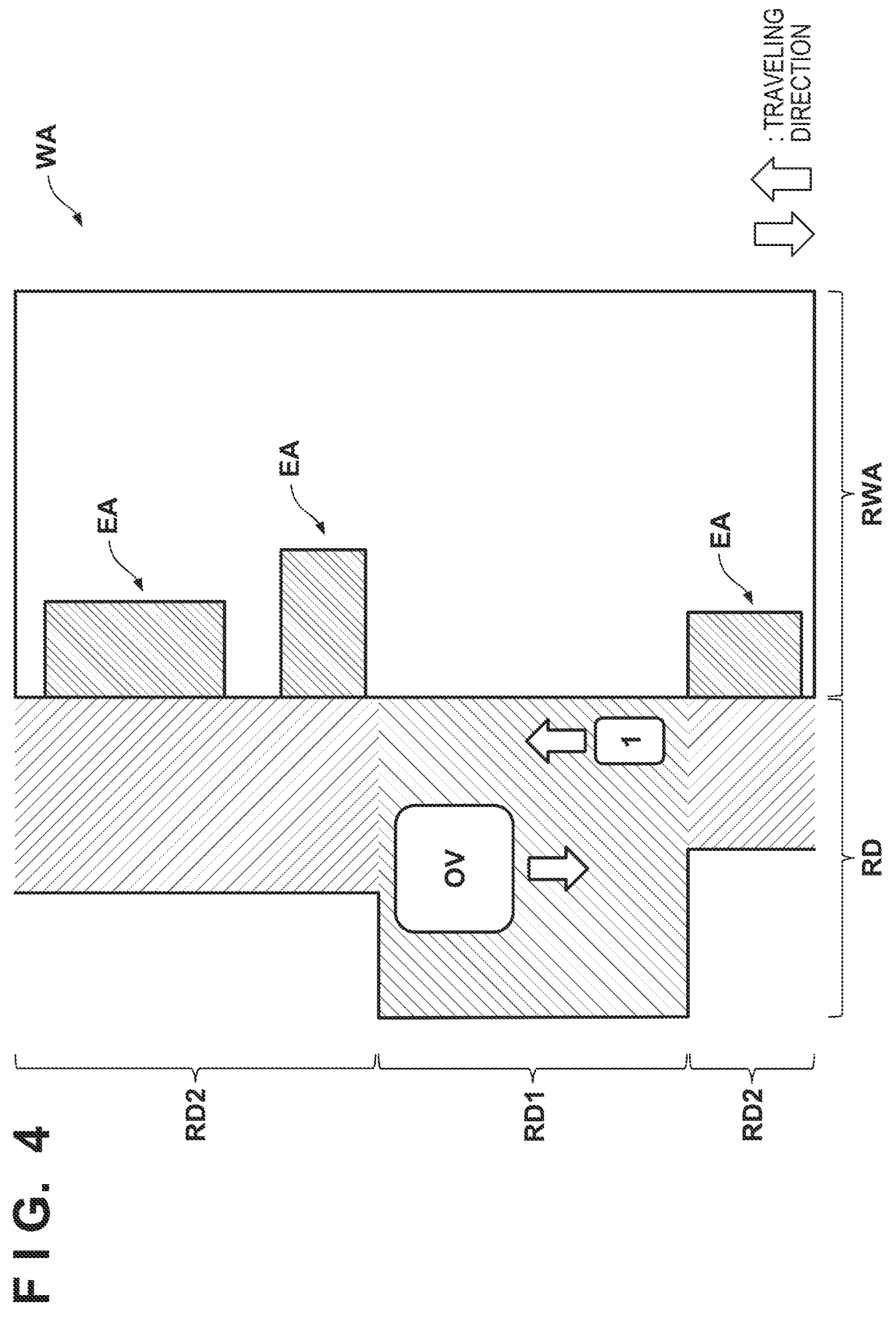
F I G. 4

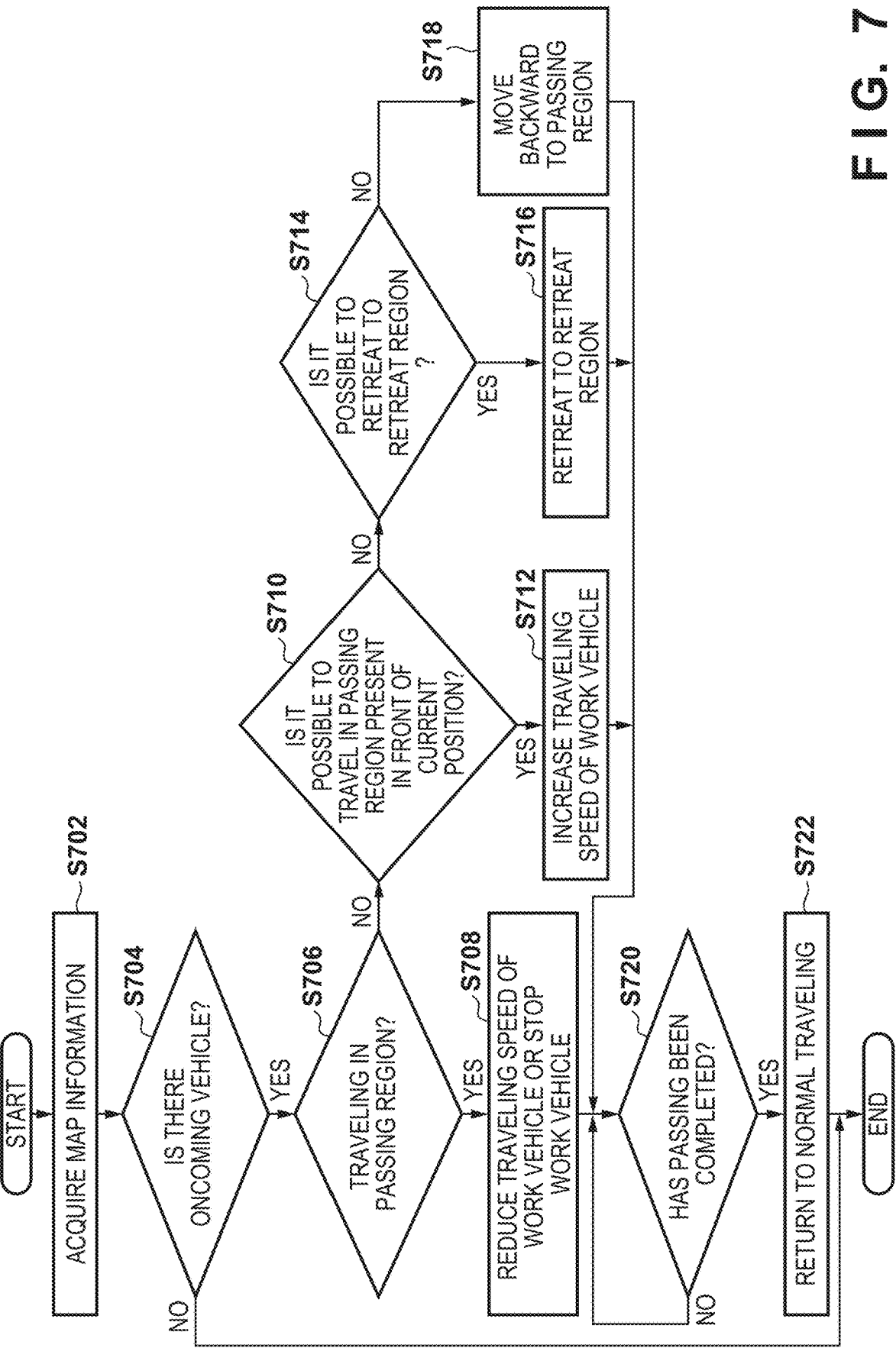
F I G. 7

F I G. 8

WORK VEHICLE, CONTROL DEVICE, CONTROL METHOD, AND SYSTEM

CROSS-REFERENCE TO RELATED APPLICATION(S)

This application is a Continuation of International Patent Application No. PCT/JP2022/000428, filed on Jan. 7, 2022, the entire disclosures of which is incorporated herein by reference.

BACKGROUND OF THE INVENTION

Field of the Invention

The present invention relates to a work vehicle, a control device, a control method, and a system.

Description of the Related Art

In recent years, in a workplace (work region) such as a construction site or a building site, an autonomous work vehicle (AWV) that automatically and autonomously travels in the work region to perform predetermined work (for example, transportation (carrying) or towing of materials, water, other supplies, and the like) without requiring an operation (driving) of a worker has been used (see Japanese Patent No. 6066241 and Japanese Patent No. 5984986). An autonomous work vehicle is disclosed in Japanese Patent No. 6066241 and Japanese Patent No. 5984986.

Japanese Patent No. 6066241 discloses a system including a plurality of forklifts capable of switching between an unmanned operation mode and a manned operation mode. Japanese Patent No. 5984986 discloses, for example, a system that manages movement of a plurality of unmanned conveyance vehicles for transporting parts, products, and the like to a target place in a travel route set in a factory or the like.

However, in an actual workplace or the like, basically, not only an autonomous work vehicle but also a manned vehicle such as a truck that requires an operation (driving) of a worker is present. Therefore, in a vehicle passage through which an autonomous work vehicle or a manned vehicle travels, there is a case where the autonomous work vehicle and the manned vehicle pass each other (that is, timings of traveling in opposite directions overlap each other). In such a case, if a width of a vehicle passage is large, an autonomous work vehicle and a manned vehicle can pass each other. However, in an actual workplace, it is often impossible to allocate a sufficient space in a vehicle passage, and a width of a vehicle passage tends to be narrowed. When a width of a vehicle passage is narrow, an autonomous work vehicle and a manned vehicle cannot pass each other, and the vehicle passage is an interference location, which hinders smooth travel of the autonomous work vehicle and the manned vehicle.

SUMMARY OF THE INVENTION

The present invention provides a new technique for allowing a work vehicle capable of traveling in a vehicle passage provided in a work region and an oncoming vehicle with respect to the work vehicle to smoothly travel.

According to an aspect of the present invention, there is provided a work vehicle capable of autonomously traveling in a vehicle passage provided in a work region, the work vehicle including an acquisition unit configured to acquire map information including information indicating a first region in which the work vehicle and an oncoming vehicle facing the work vehicle and capable of traveling in the vehicle passage are able to pass each other in the vehicle passage, information indicating a second region in which the work vehicle and the oncoming vehicle are incapable of passing each other, and information indicating a third region to which the work vehicle is capable of being retreated from the second region, and a control unit configured to control traveling of the work vehicle such that the work vehicle and the oncoming vehicle are able to pass each other in the vehicle passage on the basis of the map information acquired by the acquisition unit, wherein the control unit controls the traveling of the work vehicle such that the work vehicle travels in the first region when the work vehicle and the oncoming vehicle pass each other, and controls the traveling of the work vehicle such that the work vehicle is retreated to the third region in a case where the work vehicle is incapable of traveling in the first region when the work vehicle and the oncoming vehicle pass each other.

Further features of the present invention will become apparent from the following description of exemplary embodiments with reference to the attached drawings.

BRIEF DESCRIPTION OF THE DRAWINGS

FIG. 4 is a diagram for describing an example of specific control of traveling of the work vehicle using a control unit.

FIG. 7 is a flowchart for describing an example of traveling control of the work vehicle in the present embodiment.

FIG. 8 is a diagram illustrating an example of a retreat region.

DESCRIPTION OF THE EMBODIMENTS

Figure 1:
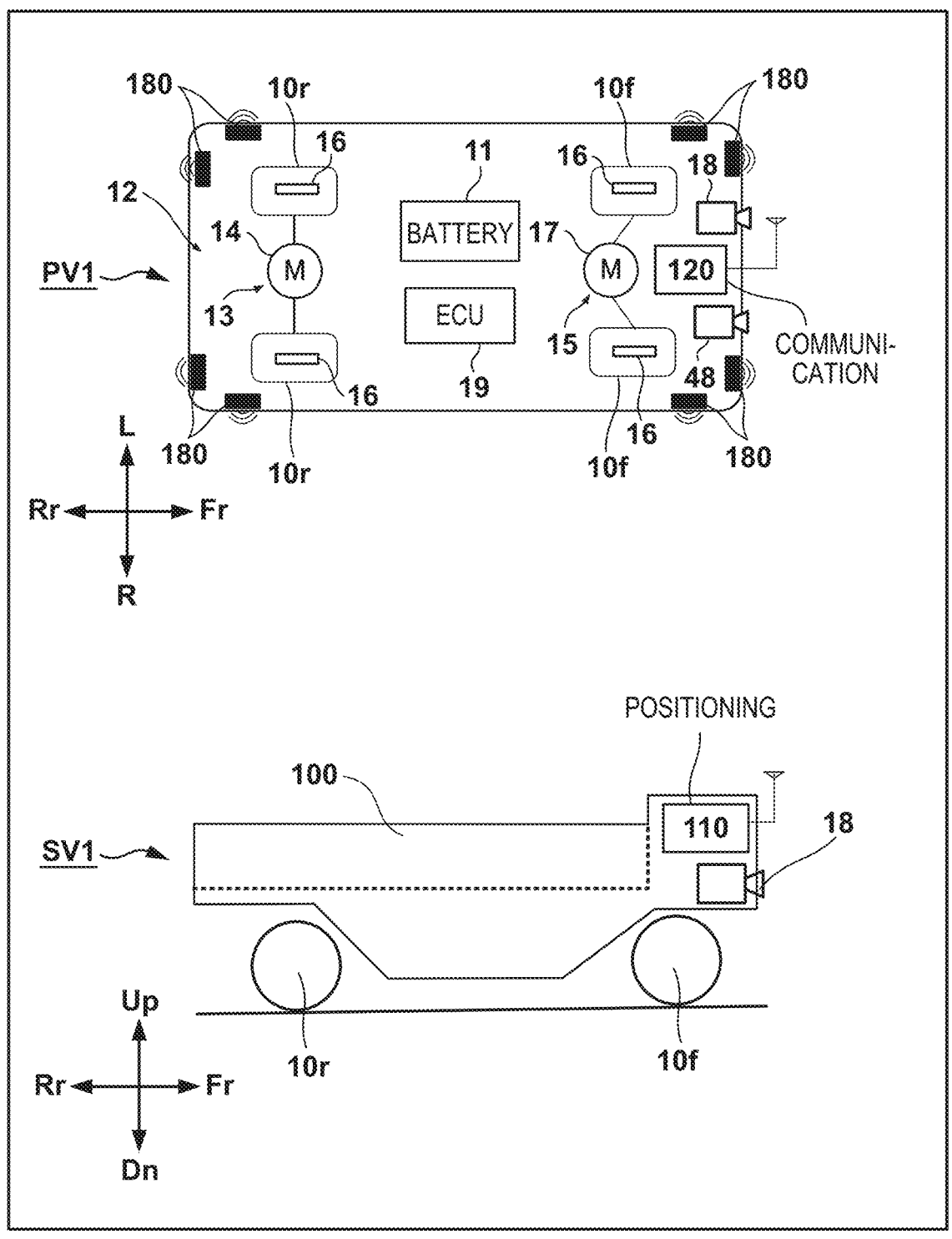
FIG. 1 is a schematic diagram illustrating a configuration of a work vehicle as one aspect of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a schematic diagram illustrating a configuration of a work vehicle 1 as one aspect of the present invention, in which PV1 is a plan view of the work vehicle 1, and SV1 is a side view of the work vehicle 1. Fr, Rr, L, and R illustrated in FIG. 1 respectively represent front, rear, left, and right at the time of forward travel of the work vehicle 1. In addition, Up and Dn illustrated in FIG. 1 respectively represent upward and downward with respect to the work vehicle 1.

The work vehicle 1 is a vehicle (autonomous work vehicle) capable of autonomously traveling along a vehicle passage provided in a relatively large work region embodied as a workplace such as a construction site or a building site without requiring an operation (driving) of a worker. Therefore, the work vehicle 1 is a vehicle that does not include a driver's seat or a driving mechanism operated by an occupant, and is unmanned during traveling. In the present embodiment, the work vehicle 1 is a four-wheeled vehicle including two front wheels 10f and two rear wheels 10r. The work vehicle 1 loads cargos including, for example, materials, water, and other supplies on a cargo bed 100, and transports (carries) the cargos.

Figure 2:
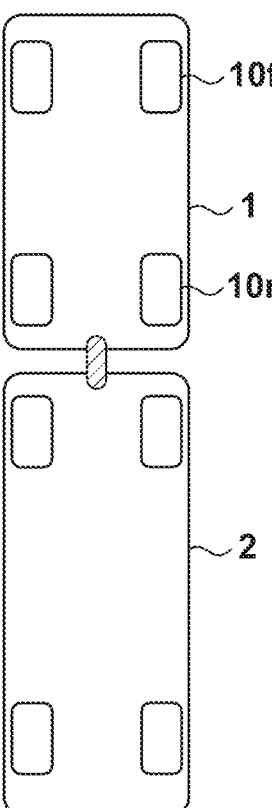
FIG. 2 is a diagram schematically illustrating a work vehicle and a carriage towed by the work vehicle.

In addition, as illustrated in FIG. 2, the work vehicle 1 may be mechanically connected to a carriage 2 including a cargo bed (not illustrated) on which cargos are loaded. Therefore, the work vehicle 1 also functions as a towing vehicle that tows the carriage 2. The carriage 2 is a vehicle that does not include a driver's seat or a driving mechanism operated by an occupant and travels in conjunction with traveling of the work vehicle 1 (that is, by being towed by the work vehicle 1). In the present embodiment, the carriage 2 is assumed to be a four-wheeled vehicle including two front wheels 10f and two rear wheels 10r, but is not limited thereto, and may be a three-wheeled vehicle or a two-wheeled vehicle. Although the work vehicle 1 tows one carriage 2 in FIG. 2, it is also possible to tow a plurality of carriages 2. FIG. 2 is a diagram schematically illustrating the work vehicle 1 and the carriage 2 towed by the work vehicle 1.

The work vehicle 1 is an electric vehicle of which a main power source is a battery 11. The battery 11 is, for example, a secondary battery such as a lithium ion battery. The work vehicle 1 self-travels according to electric power supplied from the battery 11.

The work vehicle 1 includes an electric traveling mechanism 12 for achieving autonomous traveling. The electric traveling mechanism 12 includes a traveling mechanism 13, a steering mechanism 15, and a braking mechanism 16.

The traveling mechanism 13 is a mechanism for moving the work vehicle 1 forward or backward by using a traveling motor 14 as a drive source, and in the present embodiment, drives the rear wheels 40r as drive wheels. The front wheels 10f and the rear wheels 10r are each provided with a braking mechanism 16 such as a disc brake.

In the present embodiment, the steering mechanism 15 is a mechanism that gives a steering angle to the front wheels 10f by using a steering motor 17 as a drive source. However, the steering mechanism 15 may be configured as a two-wheel steering mechanism that steers only the front wheels 10f, or may be configured as a four-wheel steering mechanism that steers the front wheels 10f and the rear wheels 10r.

The work vehicle 1 includes a detection unit 180 that detects a surrounding situation. The detection unit 180 includes an external sensor group that monitors the vicinity of the work vehicle 1. The external sensor includes, for example, a millimeter wave radar, and detects an oncoming vehicle facing the work vehicle 1 and an obstacle around the work vehicle 1 with radio waves. In addition, the external sensor includes, for example, Light Detection and Ranging (LiDAR), and detects an oncoming vehicle facing the work vehicle 1 and an obstacle around the work vehicle 1 with light. A control unit (ECU) 19 can acquire information regarding an oncoming vehicle facing the work vehicle 1 and information regarding an obstacle around the work vehicle 1 by analyzing the information detected by the detection unit 180. Here, the information regarding the oncoming vehicle facing the work vehicle 1 specifically includes a distance from the oncoming vehicle (the current position of the oncoming vehicle), a traveling speed of the oncoming vehicle, and the like. Therefore, the detection unit 180 (which functions as a second detection unit) detects the current position and the traveling speed of the oncoming vehicle in cooperation with the control unit 19. The information regarding the obstacle around the work vehicle 1 specifically includes a distance from the obstacle, a size of the obstacle, and the like. Note that the detection unit 180 can also be provided with an external sensor on each of the front part, the rear part, and the left and right lateral parts of the work vehicle 1. Accordingly, the detection unit 180 can monitor the vicinity of the work vehicle 1.

The work vehicle 1 further includes a positioning sensor 110 and a communication device 120. The positioning sensor 110 receives a positioning signal from an artificial satellite that configures a global navigation satellite system (GNSS). An example of the GNSS is a global positioning system (GPS). The positioning sensor 110 (which functions as a first detection unit) receives a positioning signal (a GNSS signal, for example, a GPS signal) and detects the current position of the work vehicle 1. The communication device 120 has a function of communicating with a server that manages the work vehicle 1 and a function of performing inter-vehicle communication with an oncoming vehicle with respect to the work vehicle 1.

The work vehicle 1 includes an image acquisition unit 18 (camera) that acquires an image of surroundings of the work vehicle 1. As illustrated in FIG. 1, the image acquisition unit 18 is provided on the front part of the work vehicle 1, for example, and acquires an image of the front when the work vehicle 1 is traveling. The image acquired by the image acquisition unit 18 is analyzed by the control unit 19 and used, for example, to acquire information regarding an oncoming vehicle facing the work vehicle 1. The image acquisition unit 18 may be provided on the rear part of the work vehicle 1 in addition to the front part of the work vehicle 1, and can acquire an image of the rear of the work vehicle 1.

The work vehicle 1 further includes the control unit 19. The control unit 19 includes a processor typified by a CPU, a storage device such as a semiconductor memory, and an interface with an external device. In the storage device, programs to be executed by the processor, data (map information) to be used by the processor for processing, and the like are stored. A plurality of sets of processors, storage devices, and interfaces may be provided for each function of the work vehicle 1 so as to be able to communicate with each other.

The control unit 19 controls traveling (autonomous traveling) of the work vehicle 1 via the electric traveling mechanism 12 on the basis of the detection result from the detection unit 180, the detection result from the positioning sensor 110, the image acquired by the image acquisition unit 18, and the like. Hereinafter, specific control of traveling of the work vehicle 1 using the control unit 19 will be described.

First, an environment in which the work vehicle 1 autonomously travels will be described with reference to FIG. 3. The work vehicle 1 is used to transport cargos such as various materials and supplies necessary for work in an actual work region RWA in which work is actually performed in a work region WA such as a construction site or a building site. Therefore, in the work region WA, a vehicle passage RD (so-called a road) for enabling the work vehicle 1 to autonomously travel is provided in proximity to the actual work region RWA. In general, in the work region WA, vehicles other than the work vehicle 1 are also used according to the work required in the actual work region RWA, and such vehicles also travel on the vehicle passage RD. Therefore, in the vehicle passage RD, the work vehicle 1 and vehicles other than the work vehicle 1 may pass each other (there may be a vehicle traveling opposite to the work vehicle 1). Hereinafter, a vehicle that passes the work vehicle 1 on the vehicle passage RD will be referred to as an oncoming vehicle. Here, if a width of the vehicle passage RD is large, the work vehicle 1 and the oncoming vehicle can pass each other. However, in practice, it is often impossible to allocate a sufficient space in the vehicle passage RD in the work region WA, and it is difficult to provide the vehicle passage RD with a constant width that allows the work vehicle 1 and the oncoming vehicle to pass each other. Therefore, there is a location (region) having a narrow width in the vehicle passage RD. In a location where the width of the vehicle passage RD is small, the work vehicle 1 and the oncoming vehicle cannot pass each other, and the location is an interference location and is a factor that hinders smooth travel of the work vehicle and the oncoming vehicle.

Therefore, in the present embodiment, there is provided a technique (traveling control of the work vehicle 1) for achieving passing of the work vehicle 1 and an oncoming vehicle and smooth travel of the work vehicle 1 that can travel in the vehicle passage RD and the oncoming vehicle (a vehicle other than the work vehicle 1) with respect to the work vehicle 1 even in a case where there is a narrow location in the vehicle passage RD provided in the work region WA.

Figure 3:
FIG. 3 is a diagram illustrating an example of an environment in which the work vehicle autonomously travels.

In the present embodiment, as illustrated in FIG. 3, a passing region RD1 (first region) in which the work vehicle 1 and an oncoming vehicle can pass each other and a non-passing region RD2 (second region) in which the work vehicle 1 and the oncoming vehicle cannot pass each other are set in advance in the work region WA (the vehicle passage RD provided in the work region WA) in order to achieve traveling control of the work vehicle 1 such that the work vehicle 1 capable of traveling in the vehicle passage RD and an oncoming vehicle with respect to the work vehicle 1 smoothly travel. The passing region RD1 is a region having a width larger than a sum of a vehicle width of the work vehicle 1 and a vehicle width of the oncoming vehicle, and the non-passing region RD2 is a region having a width smaller than the sum of the vehicle width of the work vehicle 1 and the vehicle width of the oncoming vehicle. Therefore, the width of the vehicle passage RD in the passing region RD1 is larger than the width of the vehicle passage RD in the non-passing region RD2. In the work region WA, a region having a size (that is, at least a size equivalent to the size of the work vehicle 1) in which the work vehicle 1 can stop is provided in the passing region RD1 or the actual work region RWA near the non-passing region RD2, and is set in advance as a retreat region EA (third region) to which the work vehicle 1 can retreat from the non-passing region RD2.

As described above, when the passing region RD1, the non-passing region RD2, and the retreat region EA are set for the work region WA, map information indicating the passing region RD1, the non-passing region RD2, and the retreat region EA is generated in, for example, a server that manages the work vehicle 1. The map information is information including information indicating (a position of) the passing region RD1, information indicating (a position of) the non-passing region RD2, and information indicating (a position of) the retreat region EA in the work region WA.

In the present embodiment, the map information generated by the server is acquired via the communication device 120. Therefore, in the work vehicle 1, the communication device 120 functions as an acquisition unit that acquires the map information including the information indicating (the position of) the passing region RD1, the information indicating (the position of) the non-passing region RD2, and the information indicating (the position of) the retreat region EA. However, the map information can be generated in the work vehicle 1 by setting the passing region RD1, the non-passing region RD2, and the retreat region EA for the work region WA via a setting unit such as a user interface included in the work vehicle 1. In this case, the setting unit such as the user interface included in the work vehicle 1 functions as an acquisition unit that acquires map information.

In the traveling control of the work vehicle 1, while the work vehicle 1 is traveling in the vehicle passage RD, the control unit 19 detects an oncoming vehicle traveling in the vehicle passage RD, the oncoming vehicle present in front (advancing direction) of the work vehicle 1, on the basis of a detection result from the detection unit 180 and an image acquired by the image acquisition unit 18.

When detecting an oncoming vehicle present in front of the work vehicle 1, the control unit 19 controls traveling of the work vehicle 1 such that the work vehicle 1 and the oncoming vehicle are able to pass each other in the vehicle passage RD on the basis of the map information acquired via the communication device 120. Accordingly, the work vehicle 1 and the oncoming vehicle can smoothly travel in the vehicle passage RD.

For example, as illustrated in FIG. 4, a case where the work vehicle 1 is traveling in the passing region RD1 of the vehicle passage RD is considered. Since the current position of the work vehicle 1 can be detected by the positioning sensor 110 as described above, the control unit 19 can specify whether the work vehicle 1 is traveling in the passing region RD1 of the vehicle passage RD or in the non-passing region RD2 of the vehicle passage RD by comparing the current position of the work vehicle 1 detected by the positioning sensor 110 with the map information. As illustrated in FIG. 4, in a case where the work vehicle 1 is traveling in the passing region RD1 of the vehicle passage RD, the control unit 19 adjusts a traveling speed of the work vehicle 1 such that the work vehicle 1 travels in the passing region RD1 until the work vehicle 1 passes an oncoming vehicle OV, that is, the work vehicle 1 stays in the passing region RD1 in which the work vehicle 1 is currently traveling. Here, the adjustment of the traveling speed of the work vehicle 1 is basically intended to reduce the traveling speed of the work vehicle 1 or stop the work vehicle 1 by setting the traveling speed of the work vehicle 1 to zero. However, from the viewpoint of transportation efficiency of the work vehicle 1, it is more advantageous to reduce the traveling speed of the work vehicle 1 than to stop the work vehicle 1. As described above, by controlling the traveling of the work vehicle 1 such that the work vehicle 1 travels in the passing region RD1 of the vehicle passage RD when the work vehicle 1 and the oncoming vehicle OV pass each other, even in a case where there is the non-passing region RD2 in the vehicle passage RD, the work vehicle 1 and the oncoming vehicle OV can reliably pass each other. Therefore, smooth travel of the work vehicle 1 and the oncoming vehicle OV in the vehicle passage RD can be achieved.

Figure 5:
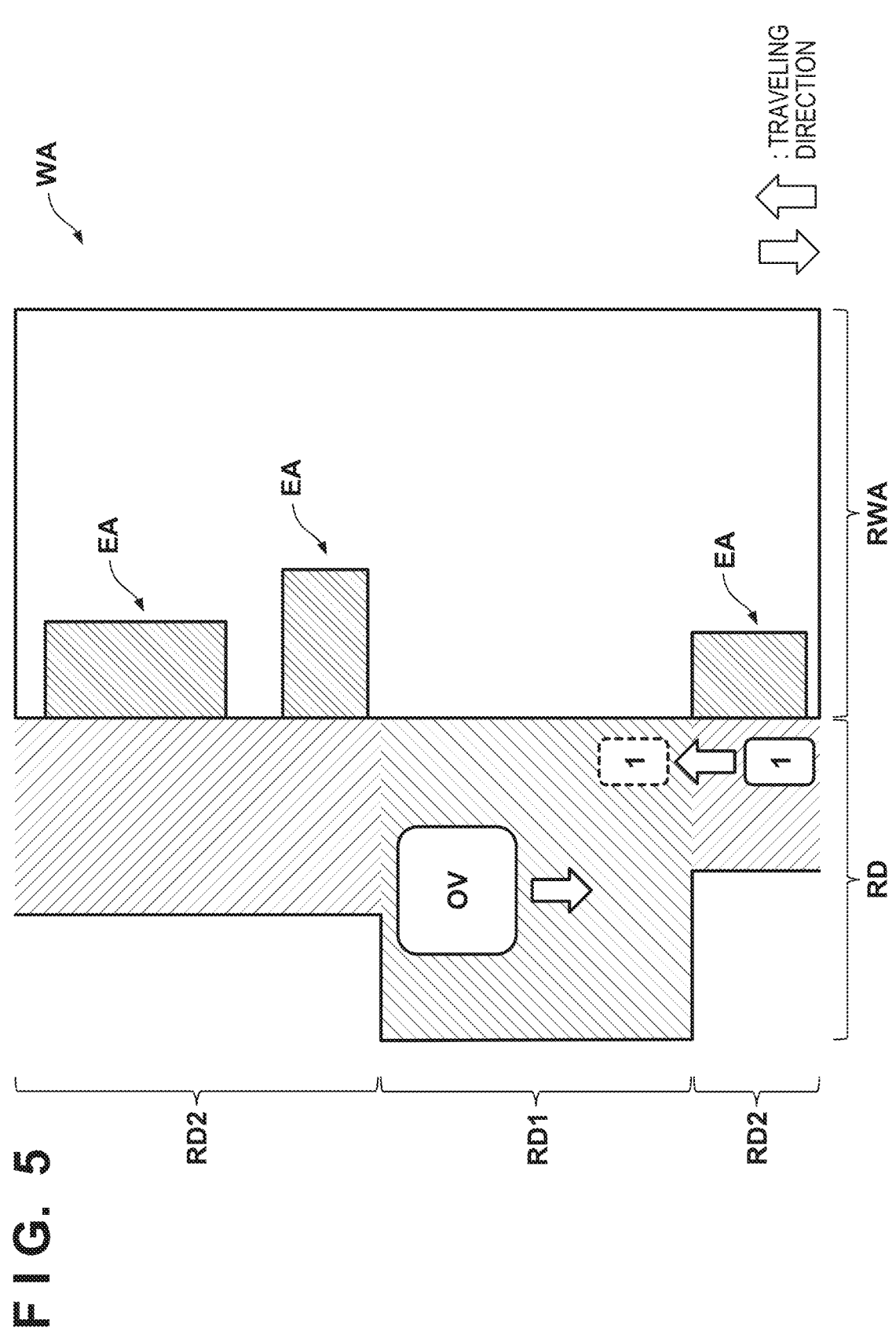
FIG. 5 is a diagram for describing an example of specific control of traveling of the work vehicle using the control unit.
Figure 6:
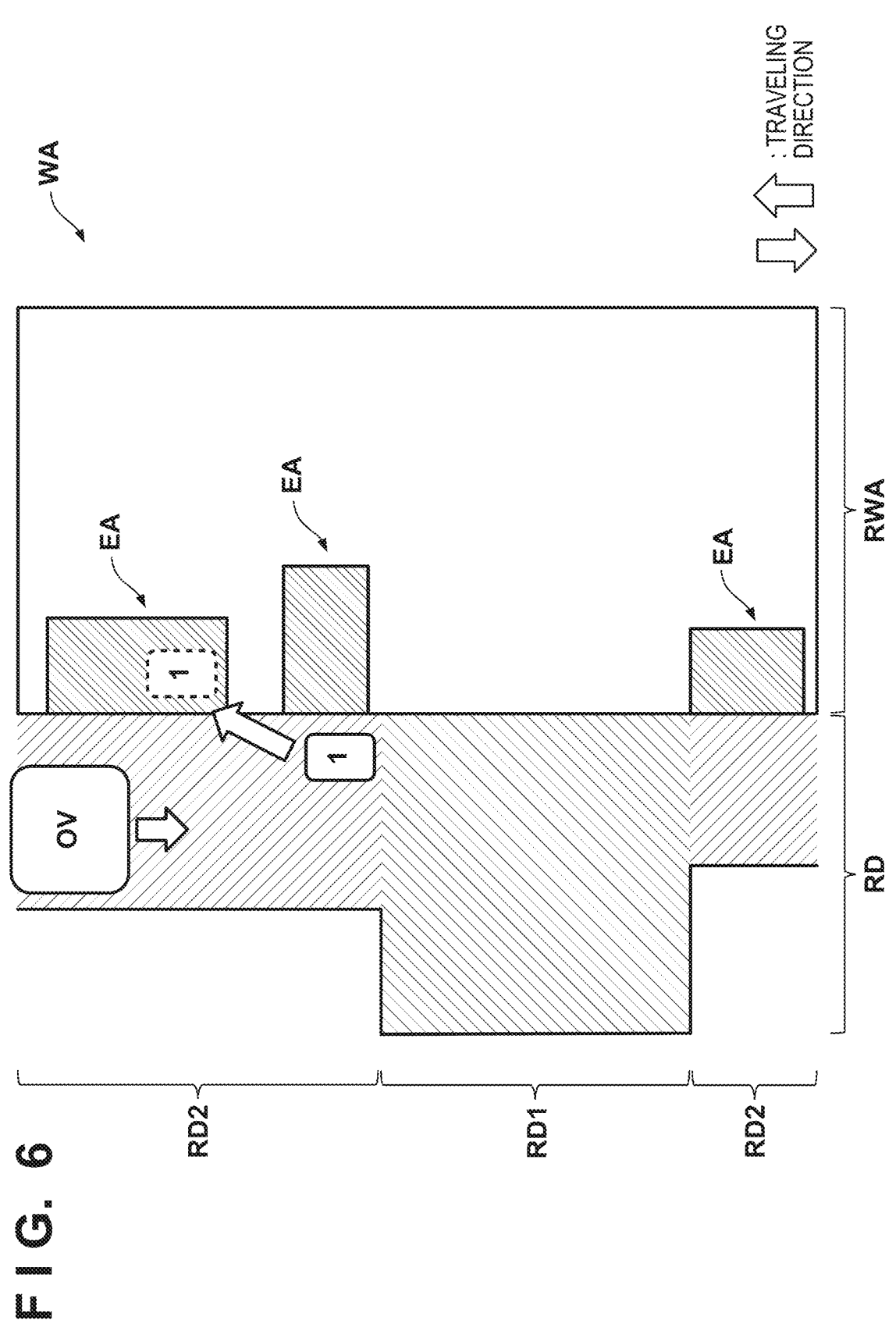
FIG. 6 is a diagram for describing an example of specific control of traveling of the work vehicle using the control unit.

As illustrated in FIGS. 5 and 6, a case where the work vehicle 1 is traveling in the non-passing region RD2 of the vehicle passage RD is considered. In this case, the control unit 19 acquires a current position and a traveling speed of the oncoming vehicle OV as information regarding the oncoming vehicle OV from a detection result from the detection unit 180 and an image acquired by the image acquisition unit 18.

On the basis of a relationship between the map information, the current position of the work vehicle 1 detected by the positioning sensor 110, and the current position and the traveling speed of the oncoming vehicle OV, in a case where the work vehicle 1 can travel in the passing region RD1 (the passing region RD1 present in front of the current position of the work vehicle 1) before passing the oncoming vehicle OV by causing the work vehicle 1 to travel forward (by continuing traveling forward of the work vehicle 1), the control unit 19 adjusts the traveling speed of the work vehicle 1 such that the work vehicle 1 travels in the passing region RD1 present in front of the current position when the work vehicle 1 and the oncoming vehicle OV pass each other as illustrated in FIG. 5. Here, the adjustment of the traveling speed of the work vehicle 1 is basically intended to increase the traveling speed of the work vehicle 1. As a result, the work vehicle 1 and the oncoming vehicle OV can reliably pass each other, so that smooth travel of the work vehicle 1 and the oncoming vehicle OV in the vehicle passage RD can be achieved.

On the other hand, in a case where the work vehicle 1 cannot travel in the passing region RD1 present in front of the work vehicle 1 before the work vehicle 1 passes the oncoming vehicle OV by causing the work vehicle 1 to travel forward on the basis of the relationship between the map information, the current position of the work vehicle 1 detected by the positioning sensor 110, and the current position and the traveling speed of the oncoming vehicle OV, the control unit 19 adjusts at least one of the traveling speed and the traveling direction of the work vehicle 1 such that the work vehicle 1 is retreated to the retreat region EA as illustrated in FIG. 6. Here, the adjustment of at least one of the traveling speed and the traveling direction of the work vehicle 1 is basically intended to reduce or increase the traveling speed of the work vehicle 1 and move the work vehicle 1 forward or backward such that the work vehicle 1 is retreated to the retreat region EA present near (closest to) the current position of the work vehicle 1. However, from the viewpoint of transportation efficiency of the work vehicle 1, it is more advantageous to move the work vehicle 1 forward than to move the work vehicle 1 backward. As described above, when the work vehicle 1 and the oncoming vehicle OV pass each other, in a case where the work vehicle 1 cannot travel in the passing region RD1 of the vehicle passage RD, the work vehicle 1 is controlled to retreat to the retreat region EA. In other words, by retreating the work vehicle 1 to the retreat region EA until the oncoming vehicle OV passes, it is possible to cause the work vehicle 1 and the oncoming vehicle OV to reliably pass each other, so that smooth travel of the work vehicle 1 and the oncoming vehicle OV in the vehicle passage RD can be achieved.

In the present embodiment, when the work vehicle 1 cannot travel in the passing region RD1 present in front of the work vehicle 1 before the work vehicle 1 passes the oncoming vehicle OV, the work vehicle 1 is retreated to the retreat region EA, but the present invention is not limited thereto. For example, even in a case where the work vehicle 1 can travel in the passing region RD1 present in front of the work vehicle 1 before the work vehicle 1 passes the oncoming vehicle OV, if the work vehicle 1 is traveling in the non-passing region RD2 of the vehicle passage RD, the work vehicle 1 may be controlled such that the work vehicle

1 is retreated to the retreat region EA when the work vehicle 1 passes the oncoming vehicle OV. As described above, regardless of whether the work vehicle 1 cannot travel in the passing region RD1 present in front of the work vehicle 1, the work vehicle 1 and the oncoming vehicle OV can reliably pass each other by retreating the work vehicle 1 to the retreat region EA until the oncoming vehicle OV passes, so that smooth travel of the work vehicle 1 and the oncoming vehicle OV in the vehicle passage RD can be achieved.

In a case where the work vehicle 1 is traveling in the non-passing region RD2 of the vehicle passage RD, the work vehicle 1 may not be able to travel in the passing region RD1 present in front of the work vehicle 1 before passing the oncoming vehicle OV, and the work vehicle 1 may not be able to retreat to the retreat region EA, on the basis of the relationship between the current position of the work vehicle 1 detected by the positioning sensor 110 and the current position and the traveling speed of the oncoming vehicle OV. In such a case, the control unit 19 moves the work vehicle 1 backward such that the work vehicle 1 travels in the passing region RD1 present behind the current position of the work vehicle 1. As a result, it is possible to prioritize passing between the work vehicle 1 and the oncoming vehicle OV over the transportation efficiency of the work vehicle 1 and to minimize hindrance of smooth travel of the work vehicle 1 and the oncoming vehicle OV in the vehicle passage RD.

An example of traveling control of the work vehicle 1 for achieving smooth travel of the work vehicle 1 and the oncoming vehicle OV in the vehicle passage RD will be described with reference to FIG. 7. Such traveling control includes specific control of travel of the work vehicle 1 using the control unit 19 described above.

In S702, the control unit 19 acquires map information including information indicating the passing region RD1, information indicating the non-passing region RD2, and information indicating the retreat region EA in the work region WA via the communication device 120.

In S704, the control unit 19 determines whether there is an oncoming vehicle OV traveling in front of the work vehicle 1 while facing the work vehicle 1, on the basis of a detection result from the detection unit 180 and an image acquired by the image acquisition unit 18. In a case where the oncoming vehicle OV is not present in front of the work vehicle 1, the processing related to the traveling control of the work vehicle 1 is ended. On the other hand, in a case where the oncoming vehicle OV is present in front of the work vehicle 1 (that is, in a case where an oncoming vehicle is detected), the process proceeds to S706.

In S706, the control unit 19 compares the current position of the work vehicle 1 detected by the positioning sensor 110 with the map information acquired in S702, and determines whether the work vehicle 1 is traveling in the passing region RD1 of the vehicle passage RD. In a case where the work vehicle 1 is traveling in the passing region RD1, the process proceeds to S708. In a case where the work vehicle 1 is not traveling in the passing region RD1 (that is, in a case where the work vehicle 1 is traveling in the non-passing region RD2), the process proceeds to S710.

In S708, the control unit 19 reduces the traveling speed of the work vehicle 1 or stops the work vehicle 1 via the electric traveling mechanism 12 such that the work vehicle 1 travels in the passing region RD1 in which the work vehicle 1 is currently traveling (that is, the work vehicle 1 stays in the passing region RD1) until the work vehicle 1 passes the oncoming vehicle OV.

In S710, the control unit 19 determines whether the work vehicle 1 can travel in the passing region RD1 present in front of the current position before passing the oncoming vehicle OV on the basis of the map information acquired in S702, the current position of the work vehicle 1 detected by the positioning sensor 110, and the current position and the traveling speed of the oncoming vehicle OV obtained from the detection result from the detection unit 180 and the image acquired by the image acquisition unit 18. Note that the current position and the traveling speed of the oncoming vehicle OV can also be acquired from the oncoming vehicle OV by performing inter-vehicle communication with the oncoming vehicle OV via the communication device 120. In a case where the work vehicle 1 can travel in the passing region RD1 present in front of the work vehicle 1, the process proceeds to S712. On the other hand, in a case where the work vehicle 1 cannot travel in the passing region RD1 present in front of the work vehicle 1, the process proceeds to S714.

In S712, when the work vehicle 1 and the oncoming vehicle OV pass each other, the control unit 19 increases the traveling speed of the work vehicle 1 via the electric traveling mechanism 12 such that the work vehicle 1 travels in the passing region RD1 present in front of the current position.

In S714, the control unit 19 determines whether or not the work vehicle 1 can retreat to the retreat region EA present near (closest to) the current position on the basis of the map information acquired in S702, the current position of the work vehicle 1 detected by the positioning sensor 110, and the current position and the traveling speed of the oncoming vehicle OV obtained from the detection result from the detection unit 180 and the image acquired by the image acquisition unit 18. In a case where the work vehicle 1 can retreat to the retreat region EA present near the current position, the process proceeds to S716. On the other hand, in a case where the work vehicle 1 cannot retreat to the retreat region EA present near the current position, the process proceeds to S718.

In S716, the control unit 19 reduces or increases the traveling speed of the work vehicle 1 via the electric traveling mechanism 12 to move the work vehicle 1 forward or backward, thereby retreating the work vehicle 1 to the retreat region EA.

In S718, the control unit 19 moves the work vehicle 1 backward via the electric traveling mechanism 12 such that the work vehicle 1 travels in the passing region RD1 present behind the current position via the electric traveling mechanism 12 (that is, the work vehicle 1 is moved backward to the passing region RD1).

The process proceeds from S708, S712, S716, or S718 to S720. In S720, the control unit 19 determines whether or not passing between the work vehicle 1 and the oncoming vehicle OV has been completed. For example, the control unit 19 analyzes the detection result from the detection unit 180 and the image acquired by the image acquisition unit 18, and obtains a travel track (travel history) of the oncoming vehicle OV and a relative position of the oncoming vehicle OV with respect to the work vehicle 1, so that it is possible to determine whether or not the passing between the work vehicle 1 and the oncoming vehicle OV has been completed. In addition, the control unit 19 may acquire the current position of the oncoming vehicle OV and the like by performing inter-vehicle communication with the oncoming vehicle OV via the communication device 120, and determine whether or not the passing between the work vehicle 1 and the oncoming vehicle OV has been completed. In a case where the passing between the work vehicle 1 and the oncoming vehicle OV has not been completed, S720 is repeatedly performed. On the other hand, in a case where the passing between the work vehicle 1 and the oncoming vehicle OV has been completed, the process proceeds to S722.

In S722, the control unit 19 returns the traveling speed and the traveling direction of the work vehicle 1 to a state before passing the oncoming vehicle OV via the electric traveling mechanism 12, thereby returning the work vehicle 1 to normal traveling.

As described above, according to the traveling control of the work vehicle 1 in the present embodiment, the smooth travel of the work vehicle 1 and the oncoming vehicle OV can be achieved by causing the work vehicle 1 and the oncoming vehicle OV to reliably pass each other in the vehicle passage RD.

In the present embodiment, as shown in S706, S710, and S714, it is determined whether to control traveling of the work vehicle 1 such that the work vehicle 1 travels in the passing region RD1 or to control traveling of the work vehicle 1 such that the work vehicle 1 is retreated to the retreat region EA when the work vehicle 1 and the oncoming vehicle OV pass each other, on the basis of the map information, the current position of the work vehicle 1, and the current position and the traveling speed of the oncoming vehicle OV. As a result, the work vehicle 1 and the oncoming vehicle OV can pass each other in an appropriate region (the passing region RD1 or the retreat region ES) according to a region where the work vehicle 1 is traveling (whether the region is the passing region RD1 or the non-passing region RD2).

As shown in S706 and S708, in a case where the current position of the work vehicle 1 is in the passing region RD1, the traveling of the work vehicle 1 is controlled such that the work vehicle 1 travels in the passing region RD1 where the work vehicle 1 is currently traveling when the work vehicle 1 and the oncoming vehicle OV pass each other. On the other hand, in a case where the current position of the work vehicle 1 is in the non-passing region RD2, as shown in S706, S710, S714, and S716, when the work vehicle 1 and the oncoming vehicle OV pass each other, traveling of the work vehicle 1 is controlled such that the work vehicle 1 is retreated to the retreat region EA, or as shown in S706, S710, and S712, traveling of the work vehicle 1 is controlled such that the work vehicle 1 travels in the passing region RD1 when the work vehicle 1 and the oncoming vehicle OV pass each other. As a result, the work vehicle 1 and the oncoming vehicle OV can reliably pass each other, so that smooth travel of the work vehicle 1 and the oncoming vehicle OV in the vehicle passage RD can be achieved.

In the present embodiment, the oncoming vehicle OV is assumed to be a manned vehicle that requires an operation (driving) by a worker (driver). As described above, in the present embodiment, since the traveling of the work vehicle 1 is controlled in a case where the work vehicle 1 and the oncoming vehicle OV need to pass each other, it is not necessary for a driver of the oncoming vehicle OV to perform an operation for avoiding the work vehicle 1, and it is possible to improve the convenience in terms of an operation of the driver of the oncoming vehicle OV.

In addition, since a situation of the work region WA, in particular, a situation of the actual work region RWA and the vehicle passage RD actually changes according to the work content in the work region WA and the progress of the work, the passing region RD1 and the non-passing region RD2 to be set in the vehicle passage RD and the retreat region EA to be set in the actual work region RWA also change. Therefore, the map information including the information indicating the passing region RD1, the information indicating the non-passing region RD2, and the information indicating the retreat region EA is preferably updated as needed (alternatively, periodically updated) in accordance with the change of the settings of the passing region RD1, the non-passing region RD2, and the retreat region EA. As a result, smooth travel of the work vehicle 1 and the oncoming vehicle OV according to the situation of the work region WA can be achieved.

In the present embodiment, the work vehicle 1 can tow one or more carriages 2. Therefore, the work vehicle 1 that does not tow the carriage 2 and the work vehicle 1 that tows one or more carriages 2 have different total lengths, and thus the area required for the retreat region EA is also different. For example, as illustrated in FIG. 8, it is assumed that retreat regions EA1 and EA2 having different areas are set in advance as the retreat region EA in which the work vehicle 1 is retreated. In this case, the retreat region EA1 can function as a retreat region for the work vehicle 1 that does not tow the carriage 2, but cannot function as a retreat region for the work vehicle 1 that tows one or more carriages 2. On the other hand, the retreat region EA2 can function as a retreat region for both the work vehicle 1 that does not tow the carriage 2 and the work vehicle 1 that tows one or more carriages 2. As described above, whether or not the retreat region EA can be caused to function as an actual retreat region also varies depending on whether or not the work vehicle 1 tows the carriage 2 and/or the number of carriages 2 towed by the work vehicle 1. Therefore, as the map information, it is preferable to generate the map information, in particular, information indicating the retreat region EA included in the map information for each number (including zero) of carriages 2 towed by the work vehicle 1. As a result, it is possible to achieve smooth travel of the work vehicle 1 and the oncoming vehicle OV according to the situation of the work vehicle 1 (the number of towed carriages 2).

In the present embodiment, the control unit 19 (control device) of the work vehicle 1 performs the traveling control of the work vehicle 1 for achieving smooth travel of the work vehicle 1 and the oncoming vehicle OV in the vehicle passage RD. However, the present invention is not limited to this. For example, a server that manages the work vehicle 1 via a network may be provided, and the traveling control of the work vehicle 1 described above may be performed by the server. In other words, a server that performs traveling control of the work vehicle 1 described above, and a system including the server and the work vehicle 1 also configure one aspect of the present invention.

Summary of Embodiment

1. The work vehicle of the above embodiment is
a work vehicle (for example, 1) capable of autonomously traveling in a vehicle passage (for example, RD) provided in a work region (for example, WA), the work vehicle including:
an acquisition unit (for example, 120) configured to acquire map information including information indicating a first region (for example, RD1) in which the work vehicle and an oncoming vehicle (for example, OV) facing the work vehicle and capable of traveling in the vehicle passage are able to pass each other in the vehicle passage, information indicating a second region (for example, RD2) in which the work vehicle and the oncoming vehicle are incapable of passing each other, and information indicating a third region (for example, EA) to which the work vehicle is capable of being retreated from the second region; and
a control unit (for example, 19) configured to control traveling of the work vehicle such that the work vehicle and the oncoming vehicle are able to pass each other in the vehicle passage on the basis of the map information acquired by the acquisition unit, wherein
the control unit
controls the traveling of the work vehicle such that the work vehicle travels in the first region when the work vehicle and the oncoming vehicle pass each other, and
controls the traveling of the work vehicle such that the work vehicle is retreated to the third region in a case where the work vehicle is incapable of traveling in the first region when the work vehicle and the oncoming vehicle pass each other.

According to the present embodiment, a work vehicle and an oncoming vehicle can smoothly travel in a vehicle passage. Further, according to the present embodiment, since the work vehicle and the oncoming vehicle can reliably pass each other, smooth travel of the work vehicle and the oncoming vehicle in the vehicle passage can be achieved.

2. The work vehicle (for example, 1) of the above embodiment,
wherein the control unit (for example, 19) controls the traveling of the work vehicle by adjusting at least one of a traveling speed and a traveling direction of the work vehicle.

According to the present embodiment, traveling of the work vehicle can be easily and reliably controlled.

3. The work vehicle (for example, 1) of the above embodiment,
further including:
a first detection unit (for example, 110) configured to detect a current position of the work vehicle; and
a second detection unit (for example, 18, 180) configured to detect a current position and a traveling speed of the oncoming vehicle, wherein
the control unit (for example, 19) determines whether to control the traveling of the work vehicle such that the work vehicle travels in the first region (for example, RD1) or to control the traveling of the work vehicle such that the work vehicle is retreated to the third region (for example, EA) when the work vehicle and the oncoming vehicle pass each other on the basis of the map information acquired by the acquisition unit (for example, 120), the current position of the work vehicle detected by the first detection unit, and the current position and the traveling speed of the oncoming vehicle (for example, OV) detected by the second detection unit.

According to the present embodiment, the work vehicle and the oncoming vehicle can pass each other in an appropriate region (the first region or the third region) according to a region (whether the region is the first region or the second region) where the work vehicle is traveling.

4. The work vehicle (for example, 1) of the above embodiment,
wherein, in a case where the current position of the work vehicle detected by the first detection unit (for example, 110) is in the first region (for example, RD1), the control unit (for example, 19) controls the traveling of the work vehicle such that the work vehicle travels in the first region when the work vehicle and the oncoming vehicle (for example, OV) pass each other.

According to the present embodiment, since the work vehicle and the oncoming vehicle can reliably pass each other, smooth travel of the work vehicle and the oncoming vehicle in the vehicle passage can be achieved.

5. The work vehicle (for example, 1) of the above embodiment, wherein, in a case where the current position of the work vehicle detected by the first detection unit (for example, 110) is in the second region (for example, RD2), the control unit (for example, 19) controls the traveling of the work vehicle such that the work vehicle is retreated to the third region when the work vehicle and the oncoming vehicle (for example, OV) pass each other.

According to the present embodiment, since the work vehicle and the oncoming vehicle can reliably pass each other, smooth travel of the work vehicle and the oncoming vehicle in the vehicle passage can be achieved.

6. The work vehicle (for example, 1) of the above embodiment, wherein, in a case where the current position of the work vehicle detected by the first detection unit (for example, 110) is in the second region (for example, RD2), the control unit (for example, 19) controls the traveling of the work vehicle such that the work vehicle travels in the first region (for example, RD1) when the work vehicle and the oncoming vehicle (for example, OV) pass each other.

According to the present embodiment, since the work vehicle and the oncoming vehicle can reliably pass each other, smooth travel of the work vehicle and the oncoming vehicle in the vehicle passage can be achieved.

7. The work vehicle (for example, 1) of the above embodiment, wherein a width of the vehicle passage (for example, RD) in the first region (for example, RD1) is larger than a width of the vehicle passage in the second region (for example, RD2).

According to the present embodiment, the first region and the second region can be defined depending on a width of the vehicle passage.

8. The work vehicle (for example, 1) of the above embodiment, wherein the oncoming vehicle (for example, OV) includes a manned vehicle.

According to the present embodiment, it is possible to improve convenience in terms of an operation of a driver of an oncoming vehicle.

9. The control device of the above embodiment is a control device (for example, 19) for a work vehicle (for example, 1) capable of autonomously traveling in a vehicle passage (for example, RD) provided in a work region (for example, WA), the control device including:

an acquisition unit (for example, 120) configured to acquire map information including information indicating a first region (for example, RD1) in which the work vehicle and an oncoming vehicle (for example, OV) facing the work vehicle and capable of traveling in the vehicle passage are able to pass each other in the vehicle passage, information indicating a second region (for example, RD2) in which the work vehicle and the oncoming vehicle are incapable of passing each other, and information indicating a third region (for example, EA) to which the work vehicle is capable of being retreated from the second region; and a control unit (for example, 19) configured to control traveling of the work vehicle such that the work vehicle and the oncoming vehicle are able to pass each other in the vehicle passage on the basis of the map information acquired by the acquisition unit, wherein the control unit controls traveling of the work vehicle such that the work vehicle travels in the first region when the work vehicle and the oncoming vehicle pass each other, and controls the traveling of the work vehicle such that the work vehicle is retreated to the third region in a case where the work vehicle is incapable of traveling in the first region when the work vehicle and the oncoming vehicle pass each other.

According to the present embodiment, a work vehicle and an oncoming vehicle can smoothly travel in a vehicle passage. Further, according to the present embodiment, since the work vehicle and the oncoming vehicle can reliably pass each other, smooth travel of the work vehicle and the oncoming vehicle in the vehicle passage can be achieved.

10. The control method of the above embodiment is a control method of controlling a work vehicle (for example, 1) capable of autonomously traveling in a vehicle passage (for example, RD) provided in a work region (for example, WA), the control method including:

a step of acquiring map information including information indicating a first region (for example, RD1) in which the work vehicle and an oncoming vehicle (for example, OV) facing the work vehicle and capable of traveling in the vehicle passage are able to pass each other in the vehicle passage, information indicating a second region (for example, RD2) in which the work vehicle and the oncoming vehicle are incapable of passing each other, and information indicating a third region (for example, EA) to which the work vehicle is capable of being retreated from the second region; and a step of controlling traveling of the work vehicle such that the work vehicle and the oncoming vehicle are able to pass each other in the vehicle passage on the basis of the map information acquired in the step, wherein in the step of controlling the traveling of the work vehicle, the traveling of the work vehicle is controlled such that the work vehicle travels in the first region when the work vehicle and the oncoming vehicle pass each other, and the traveling of the work vehicle is controlled such that the work vehicle is retreated to the third region in a case where the work vehicle is incapable of traveling in the first region when the work vehicle and the oncoming vehicle pass each other.

According to the present embodiment, a work vehicle and an oncoming vehicle can smoothly travel in a vehicle passage. Further, according to the present embodiment, since the work vehicle and the oncoming vehicle can reliably pass each other, smooth travel of the work vehicle and the oncoming vehicle in the vehicle passage can be achieved.

11. The system of the above embodiment is a system including:

a work vehicle (for example, 1) capable of autonomously traveling in a vehicle passage (for example, RD) provided in a work region (for example, WA); and a server configured to manage traveling of the work vehicle, wherein the server includes an acquisition unit (for example, 120) configured to acquire map information indicating a first region (for example, RD1) in which the work vehicle and an oncoming vehicle (for example, OV) facing the work vehicle and capable of traveling in the vehicle passage are able to pass each other in the vehicle passage, a second region (for example, RD1) in which the work vehicle and the oncoming vehicle are incapable of passing each other, and a third region (for example, EA) to which the work vehicle is capable of being retreated from the second region, and a control unit (for example, 19) configured to control traveling of the work vehicle such that the work vehicle and the oncoming vehicle are able to pass each other in the vehicle passage on the basis of the map information acquired by the acquisition unit, and the control unit controls the traveling of the work vehicle such that the work vehicle travels in the first region when the work vehicle and the oncoming vehicle pass each other, and controls the traveling of the work vehicle such that the work vehicle is retreated to the third region in a case where the work vehicle is incapable of traveling in the first region when the work vehicle and the oncoming vehicle pass each other.

According to the present embodiment, a work vehicle and an oncoming vehicle can smoothly travel in a vehicle passage. Further, according to the present embodiment, since the work vehicle and the oncoming vehicle can reliably pass each other, smooth travel of the work vehicle and the oncoming vehicle in the vehicle passage can be achieved.

The invention is not limited to the foregoing embodiments, and various variations/changes are possible within the spirit of the invention.

What is claimed is:

1. A work vehicle capable of autonomously traveling in a vehicle passage provided in a work region, the work vehicle comprising:

at least one processor circuit with a memory comprising instructions that, when executed by the at least one processor circuit, cause the at least one processor circuit to at least:

acquire map information including information indicating a first region in which the work vehicle and an oncoming vehicle facing the work vehicle and capable of traveling in the vehicle passage are able to pass each other in the vehicle passage, information indicating a second region in which the work vehicle and the oncoming vehicle are incapable of passing each other, and information indicating a third region to which the work vehicle is capable of being retreated from the second region; and control traveling of the work vehicle such that the work vehicle and the oncoming vehicle are able to pass each other in the vehicle passage on the basis of the map information acquired, wherein the control of the traveling of the work vehicle further comprises:

controlling the traveling of the work vehicle such that the work vehicle travels in the first region when the work vehicle and the oncoming vehicle pass each other, and controlling the traveling of the work vehicle such that the work vehicle is retreated to the third region in a case where the work vehicle is incapable of traveling in the first region when the work vehicle and the oncoming vehicle pass each other.

2. The work vehicle according to claim 1, wherein the control of the traveling of the work vehicle further comprises control of the traveling of the work vehicle by adjusting at least one of a traveling speed and a traveling direction of the work vehicle.

3. The work vehicle according to claim 1, further comprising:

a first detector configured to detect a current position of the work vehicle; and a second detector configured to detect a current position and a traveling speed of the oncoming vehicle, wherein the control of the traveling of the work vehicle further comprises determining whether to control the traveling of the work vehicle such that the work vehicle travels in the first region or to control the traveling of the work vehicle such that the work vehicle is retreated to the third region when the work vehicle and the oncoming vehicle pass each other on the basis of the map information acquired, the current position of the work vehicle detected by the first detector, and the current position and the traveling speed of the oncoming vehicle detected by the second detector.

4. The work vehicle according to claim 3, wherein, in a case where the current position of the work vehicle detected by the first detector is in the first region, the traveling of the work vehicle is controlled such that the work vehicle travels in the first region when the work vehicle and the oncoming vehicle pass each other.

5. The work vehicle according to claim 3, wherein, in a case where the current position of the work vehicle detected by the first detector is in the second region, the traveling of the work vehicle is controlled such that the work vehicle is retreated to the third region when the work vehicle and the oncoming vehicle pass each other.

6. The work vehicle according to claim 3, wherein, in a case where the current position of the work vehicle detected by the first detector is in the second region, the traveling of the work vehicle is controlled such that the work vehicle travels in the first region when the work vehicle and the oncoming vehicle pass each other.

7. The work vehicle according to claim 1, wherein a width of the vehicle passage in the first region is larger than a width of the vehicle passage in the second region.

8. The work vehicle according to claim 1, wherein the oncoming vehicle includes a manned vehicle.

9. A control device for a work vehicle capable of autonomously traveling in a vehicle passage provided in a work region, the control device comprising:

at least one processor circuit with a memory comprising instructions that, when executed by the at least one processor circuit, cause the at least one processor circuit to at least:

acquire map information including information indicating a first region in which the work vehicle and an oncoming vehicle facing the work vehicle and capable of traveling in the vehicle passage are able to pass each other in the vehicle passage, information indicating a second region in which the work vehicle and the oncoming vehicle are incapable of passing each other, and information indicating a third region to which the work vehicle is capable of being retreated from the second region; and control traveling of the work vehicle such that the work vehicle and the oncoming vehicle are able to pass each other in the vehicle passage on the basis of the map information acquired, wherein the control of the traveling of the work vehicle further comprises:

controlling traveling of the work vehicle such that the work vehicle travels in the first region when the work vehicle and the oncoming vehicle pass each other, and controlling the traveling of the work vehicle such that the work vehicle is retreated to the third region in a case where the work vehicle is incapable of traveling in the first region when the work vehicle and the oncoming vehicle pass each other.

10. A control method of controlling a work vehicle capable of autonomously traveling in a vehicle passage provided in a work region, the control method comprising:

a step of acquiring map information including information indicating a first region in which the work vehicle and an oncoming vehicle facing the work vehicle and capable of traveling in the vehicle passage are able to pass each other in the vehicle passage, information indicating a second region in which the work vehicle and the oncoming vehicle are incapable of passing each other, and information indicating a third region to which the work vehicle is capable of being retreated from the second region; and a step of controlling traveling of the work vehicle such that the work vehicle and the oncoming vehicle are able to pass each other in the vehicle passage on the basis of the map information acquired in the step, wherein in the step of controlling the traveling of the work vehicle, the traveling of the work vehicle is controlled such that the work vehicle travels in the first region when the work vehicle and the oncoming vehicle pass each other, and the traveling of the work vehicle is controlled such that the work vehicle is retreated to the third region in a case where the work vehicle is incapable of traveling in the first region when the work vehicle and the oncoming vehicle pass each other.

11. A system comprising:

a work vehicle capable of autonomously traveling in a vehicle passage provided in a work region; and a server configured to manage traveling of the work vehicle, wherein the server comprises at least one processor circuit with a memory comprising instructions that, when executed by the at least one processor circuit, cause the at least one processor circuit to at least:

acquire map information indicating a first region in which the work vehicle and an oncoming vehicle facing the work vehicle and capable of traveling in the vehicle passage are able to pass each other in the vehicle passage, a second region in which the work vehicle and the oncoming vehicle are incapable of passing each other, and a third region to which the work vehicle is capable of being retreated from the second region, and control traveling of the work vehicle such that the work vehicle and the oncoming vehicle are able to pass each other in the vehicle passage on the basis of the map information, and the control of the traveling of the work vehicle further comprises:

controlling the traveling of the work vehicle such that the work vehicle travels in the first region when the work vehicle and the oncoming vehicle pass each other, and controlling the traveling of the work vehicle such that the work vehicle is retreated to the third region in a case where the work vehicle is incapable of traveling in the first region when the work vehicle and the oncoming vehicle pass each other.

12. The work vehicle according to claim 1, wherein the third region is a region having at least a size equivalent to a size of the work vehicle in which the work vehicle is able to stop, and the region is provided in the first region or an actual work region near the second region.

* * * * *